United States Patent

[11] 3,630,243

[72] Inventors Douglas D. Hamilton
 Mount Royal, Quebec;
 Domenico Benedetto, Montreal, Quebec,
 both of Canada
[21] Appl. No. 868,725
[22] Filed Oct. 23, 1969
[45] Patented Dec. 28, 1971
[73] Assignees Paper Company
 Montreal, Quebec, ;
 Quebec North Shore Paper Company
 Montreal, Quebec; Abitibi St. Anne Paper
 Ltd.,, Beaupre, Quebec, Canada, part
 interest to each
[32] Priority Oct. 23, 1968
[33] Canada
[31] 033,299

[54] TREE-BUNCHING MECHANISM AND TREE-SKIDDER VEHICLE INCORPORATING THE SAME
16 Claims, 7 Drawing Figs.

[52] U.S. Cl. .................................................. 144/3 D,
 214/3, 214/85.5, 214/523
[51] Int. Cl. ........................................................ A01g 23/02
[50] Field of Search .......................................... 144/2 Z, 3
 D, 34 R, 34 E, 309 AC; 214/3, 77, 85.5, 147 AS,
 147 G, 523, 92, 94

[56] References Cited
UNITED STATES PATENTS

| | | | |
|---|---|---|---|
| 1,797,064 | 3/1931 | Wickes et al. ................. | 214/3 |
| 2,290,384 | 7/1942 | Rowe ............................. | 214/85.5 |
| 3,102,563 | 9/1963 | Horncastle .................... | 144/3 |
| 3,477,596 | 11/1969 | Michaelson et al. .......... | 214/147 G |

Primary Examiner—Gerald A. Dost
Attorney—Craig, Antonelli & Hill

ABSTRACT: A tree-handling vehicle including a knuckle boom pivotally mounted on an articulated vehicle for slewing about a vertical axis and incorporating a felling head on the free end of the boom comprising the combination of a grapple and a shear rigidly secured to a common frame pivotally attached to the boom. A log-handling unit or tree-bunching mechanism, as it may also be referred to, is mounted on the trailing chassis of the articulated vehicle and includes a pair of L-shaped arms at least one of which is pivotally attached to the vehicle and having a flexible cable detachably secured to one arm and the other is attached to a drum of a winch mounted on the vehicle. The cable passes over self-aligning sheaves pivotally mounted on the other of the two arms. The arms are movable relative to one another to open and close the noose and the size of such noose is varied by winding in or paying out the cable.

PATENTED DEC 28 1971 3,630,243

INVENTORS
DOUGLAS D. HAMILTON and DOMENICO BENEDETTO
BY
Craig, Antonelli, Stewart & Hill
ATTORNEYS

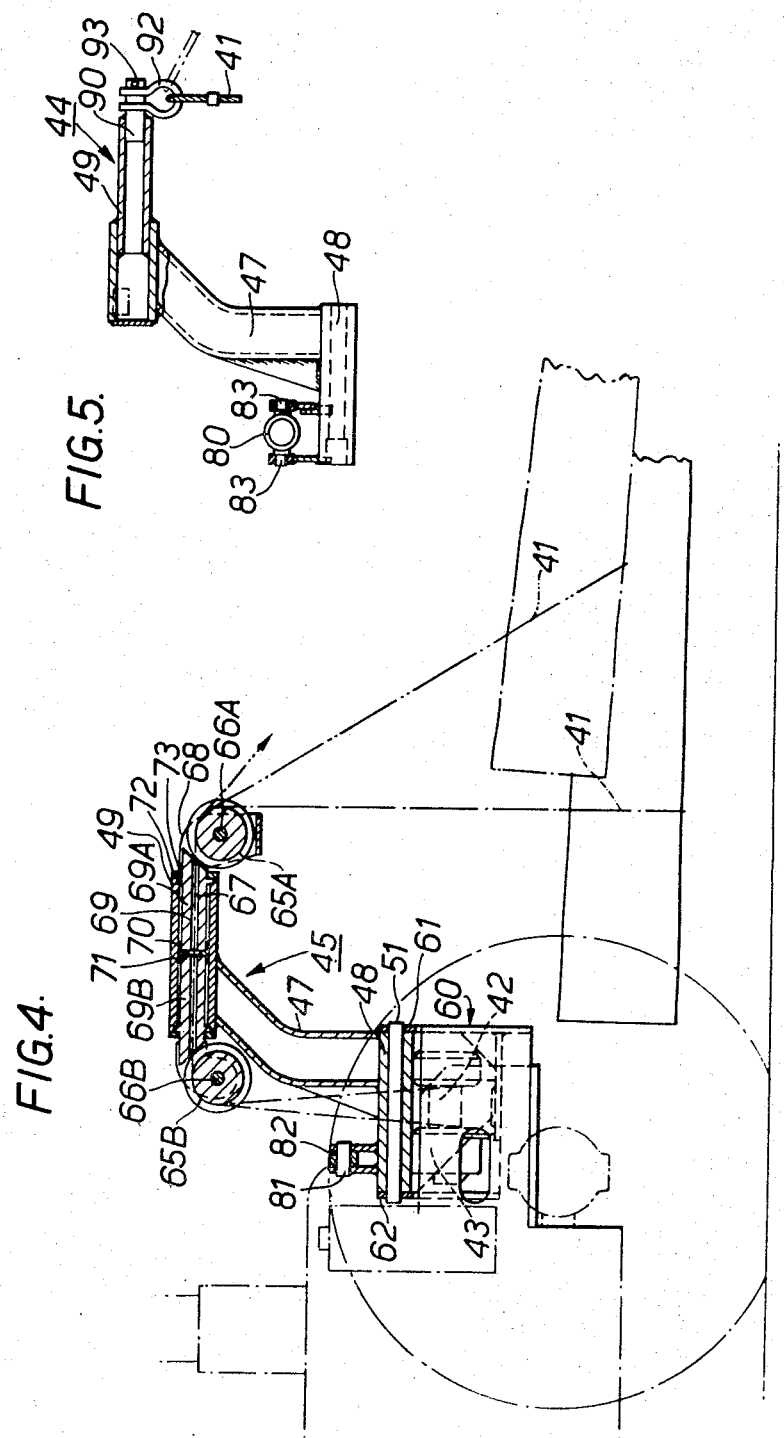

INVENTORS
DOUGLAS D. HAMILTON and DOMENICO BENEDETTO
BY
Craig, Antonelli, Stewart & Hill
ATTORNEYS

TREE-BUNCHING MECHANISM AND TREE-SKIDDER VEHICLE INCORPORATING THE SAME

This invention relates to improvements in log-handling apparatus, and particularly to an improved tree-bunching mechanism incorporating a flexible member defining a noose for embracing one or more trees. The invention further relates to a tree-skidding vehicle incorporating an improved bunk for anchoring the trees to the vehicle and which includes a flexible member detachably anchored at its free terminal end to the vehicle for ready conversion to a choker-type skidder.

Tree-skidding vehicles are well known and the type to which the present invention relates includes a flexible member forming a noose for embracing one or more trees. An example of the same is found in U.S. Pat. No. 3,102,562 issued Sept. 3, 1963, and a further example is found in U.S. Pat. No. 3,204,983 issued Sept. 7, 1965. In the apparatus disclosed in U.S. Pat. No. 3,102,562, a flexible cable forms a closed loop to embrace a bundle of trees and the size of the loop is varied by winding the cable onto and off a winch drum. The cable is attached to arms pivotally mounted on a support such that the loop may be selectively opened and closed respectively to receive and embrace a single tree or group of trees. The apparatus disclosed in U.S. Pat. No. 3,204,983 includes an assembly of rigid components forming a jaw which may selectively be opened and closed by movable arms. The bite of the jaw may be varied by changing the tension of flexible members anchored to the jaw members. One disadvantage with each of the patented structures, as well as other skidder vehicles having bunks permanently attached thereto, is that a load is either fully attached to the vehicle for skidding purposed or detached therefrom in an unloaded condition. It is impossible, in either of the patented structures, to have the flexible cable remain embracing a bundle of trees while the vehicle is moved forwardly. Because of terrain and conditions under which skidders operate, it is often necessary to remove the load from the vehicle so that the vehicle may proceed forwardly. Because of this drawback, there are a number of skidder vehicles of the choker type where a flexible cable embraces one or more trees but the latter has the disadvantage of manually having to place the choker on each tree or group of trees. Such vehicles are not suitable for use in collecting medium-sized, sparsely located trees into a bundle and instead are used mainly for moving large trees where only two or three trees are a full load for the vehicle. In harvesting smaller trees, they are collected in larger loads, the collecting of the same is often referred to as bunching.

A principal object of the present invention is to provide an improved bunching mechanism of the type generally illustrated in U.S. Pat. No. 3,102,562 but which also incorporates the feature of a choker whereby the cable may be partially detached from the vehicle and used as a choker to remain embracing a bunch of trees while the vehicle is moved forwardly independent of the load, thereafter allowing the latter to be winched to a position adjacent the vehicle. Winching the load provides considerable mechanical advantage over dragging the load by the vehicle, thus adapting the same to be usable in sometimes adverse terrain conditions.

Accordingly, in accordance with one aspect of the present invention, there is provided a tree-bunching mechanism which includes a support, an anchor on said support, an arm pivotally mounted on said support and having the free end thereof movable toward said anchor to a first position adjacent thereto and away therefrom to a second position in selected spaced relation with respect thereto, a winch assembly including a drum, a flexible member detachably connected to said anchor and connected to said drum for winding onto and off said drum selectively to vary the size of a closed loop formed by the flexible member when said arm is in said first position, means guiding said flexible member over said arm at a position spaced from the pivotal mounting of the same on said support and means to pivot said arm on said support from said first position to said second position and vice versa, respectively, to open and close said closed loop.

Another drawback to the prior devices of the type illustrated in the aforementioned patents is the lack of appropriately guiding the flexible cable member over the arms. In each of the patented structures, the cable passes over sheaves journaled on the movable arms. The sheaves pivot about axes generally parallel to the length of the articles held captive and thus force applied articles generally longitudinally thereof, for example, as in the case when skidding trees, tends to remove the cable from the sheaves.

Accordingly, another principal object of the present invention is to provide improved guide means for the cable of an article holding device using a flexible cable to embrace various sizes of loads.

Another principal object of the present invention is to provide an article-holding device which may be attached to an existing vehicle and so constructed that the loop in the flexible cable is located rearwardly of the vehicle.

Known tree-skidding vehicles are basically of two different types with reference to manner in which the load is placed relative to the vehicle. In the aforementioned U.S. Pat. No. 3,102,562, it will be noted that the load is carried only by the flexible member and accordingly, may be dropped, at any time, vertically downwardly onto the ground. Contrary to this is a bunk type where the load is supported on a rigid frame on the vehicle, as exemplified by the apparatus disclosed in the aforementioned U.S. Pat. No. 3,204,983 and U.S. Pat. No. 3,227,295 issued Jan. 4, 1966. A basic advantage of the former type is that vertical lifting of the tree butt end to place it in the clasping portion is minimized. Also it reduces the height of the center of gravity of the vehicle.

The apparatus illustrated in U.S. Pat. No. 3,102,562 has been specially constructed to provide a space for receiving the trees by providing a U-shaped frame. In accordance with another aspect of the present invention, there is provided a log-handling unit adapted to be attached to a mobile vehicle, and including a base securable to the vehicle, an arm pivotally mounted on the base and having a cable guide portion extending outwardly therefrom sufficiently to terminate at a position rearwardly of the vehicle when mounted thereon, and a cable anchor on said base, said anchor similarly being located rearwardly of the vehicle whereby a cable suspended from the guide and anchor and extending from one to the other is located rearwardly of the vehicle.

In accordance with a still further object of the present invention, there is provided in a load-holding apparatus incorporating a cable for embracing a load, the improvement comprising: a guide assembly, between a winch on which the cable is wound and the load, directing said cable in a direction parallel to the length of the load whereby the same may be drawn longitudinally by said cable without normally becoming displaced from the guide.

The invention is illustrated by way of example in the accompanying drawings wherein:

FIG. 4 is a partial sectional side elevational view of the assembly illustrated in FIG. 3;

FIG. 5 is a side elevational view of a cable anchor on the buncher assembly illustrated in FIGS. 1 to 4 inclusive;

Figure 1:
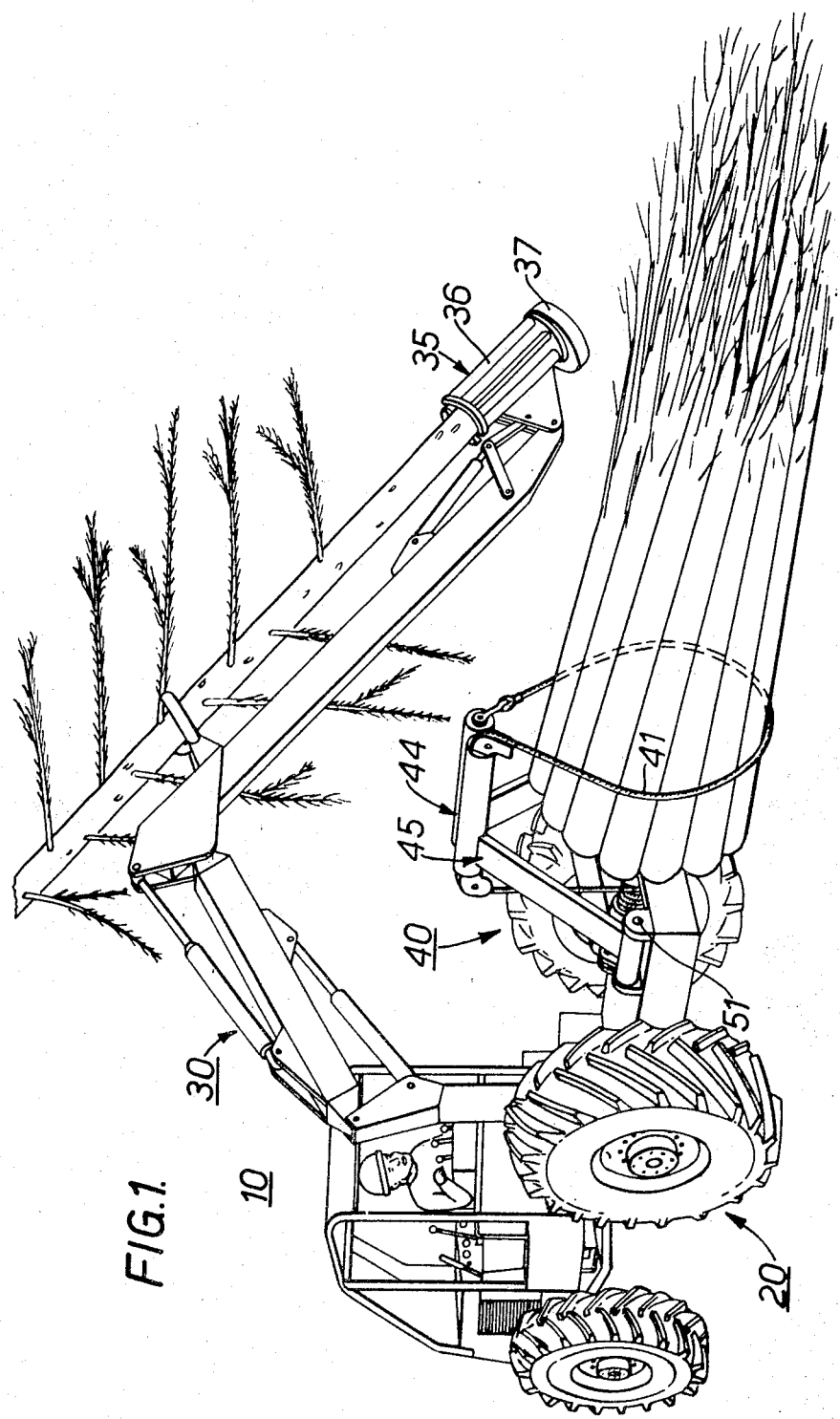
FIG. 1 is an oblique view of a tree felling skidding machine incorporating a tree-bunching mechanism constructed in accordance with one aspect of the present invention.

Referring now in detail to the drawings, illustrated in FIG. 1 is a log-handling vehicle 10 consisting of a self-propelled tractor unit 20 having an extendible and retractable boom assembly 30 pivotally mounted thereon for movement about a vertical axis. The boom assembly 30 has a felling head 35 attached to the free end thereof consisting of a grapple 36 and a shear 37 located on the lower end of the grapple. Attached to the tractor 20 is a combined tree-bunching mechanism and choker assembly 40.

The assembly 40 includes a flexible cable 41 wound on the drum 42 of a winch assembly 43 and is detachably connected adjacent the free distal end thereof to an anchor 44 secured to the vehicle. The flexible cable 41 is guided by a member 45 pivotally mounted on the vehicle and located between the winch and looped portion of the cable. The guide 45 consists of an arm pivotally mounted by a pin 51 on the vehicle and is movable toward and away from the anchor 44 selectively to close and open a loop formed in the cable portion between the guide and the anchor. Accordingly, the loop formed in the cable may be opened to receive further trees and closed to embrace the trees for moving the same in an assembled bundle. Winching of the cable 41 onto the drum 42 reduces the size of the loop tightly to grasp the group of trees and thereafter the vehicle may be driven forwardly to skid the trees to a selected location.

Figure 2:
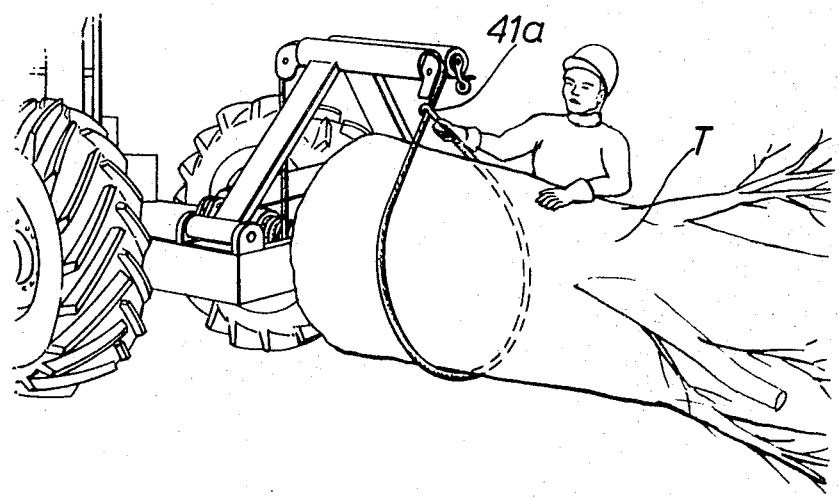
FIG. 2 is a partial schematic view of the vehicle illustrated in FIG. 1 and wherein the flexible cable is detached from its anchor on the vehicle to serve as a choker.

The free end of the cable 41 is detachably secured to the anchor 44 as, for example, by a hook and loop arrangement attached respectively to one or the other of the anchor and distal end of the cable. In FIG. 2, the distal end of the cable 41 is illustrated detached from the anchor 44 and a hook 41A in the end of the cable slidably receives a portion of the cable to form a noose member adapted to embrace one or more trees T. In the arrangement illustrated in FIG. 2, the cable may be paid out from the winch drum 42 allowing the bundled trees T to remain stationary while the vehicle is moved forwardly to a more favorable location. After the vehicle has been moved to such location, the load may be winched forwardly by winding the cable onto the winch drum 42.

Figure 3:
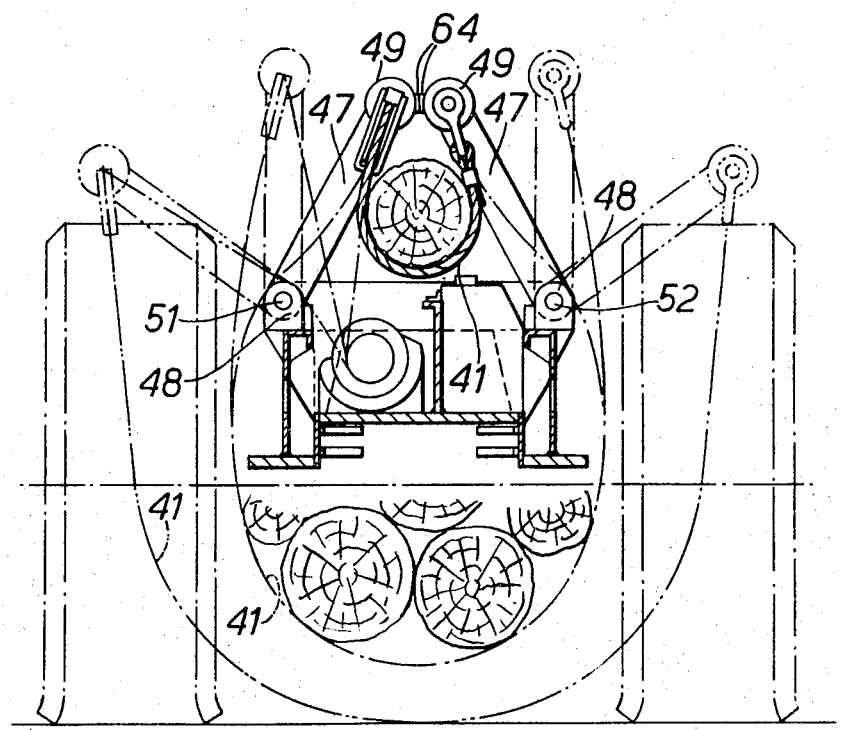
FIG. 3 is a partial schematic rear, partial sectional elevational view of the buncher assembly illustrated on the machine in FIGS. 1 and 2.

As seen from FIGS. 1 to 4 inclusive, the anchor 44 and guide arm 45 are each L-shaped in elevational view having an arm 47 connected at opposed ends respectively to a mounting member 48 and upper horizontal arm portion 49. The guide member 45 is pivotally mounted on a base 60 by the pin 51 passing through the mounting 48 in the arm and aligned apertures in vertically disposed spaced flange members 61 and 62 on the base 60. The anchor member 44 is shown pivotally mounted on the base 60 in a similar manner, or alternatively, rigidly secured thereto. In FIG. 3, anchor member 44 is shown pivotally mounted on the base 60 by a mounting pin 52. The guide member 45 and anchor member 44 may be independently pivoted about their respective mounting pins 51 and 52 by hydraulic cylinder assemblies or the like, or alternatively, individually moved by hydraulic cylinders or the like.

The arms 47 of the respective members 44 and 45 are substantially the same length and the free ends are movable toward and away from one another. Abutments or stops 64 may be provided on adjacent faces of the members 44 and 45 for engagement with one another upon pivotal movement of the arms toward one another as illustrated in FIG. 3. The pivot pins 51 and 52 are located one on each side of the abutments when the latter are in the engaged position and the arms, according, are held in the abutting position by a load carried in the cable 41 extending from member 45 to anchor 44. The pair of arms 47 of respective members 44 and 45, together with the cable 41, form a closed loop and the bite may be varied by winding the cable onto and off the winch drum 42 to change the free length of cable extending from the guide 45 to the anchor member 44.

The guide arm 45 includes a pair of sheaves 65A and 65B pivotally mounted thereon by respective mounting pins 66A and 66B. The sheaves 65A and 65B are located one at each of opposite ends of the horizontal portion 49 with the upper portion of the sheaves being in alignment with a bore 67 extending through such horizontal arm portion 49. The winch assembly 43 is mounted on the base 60 in a position enabling the cable 41 to extend from the winch drum 42 onto sheave 65B. If desired, the axis of winch drum 42 may be coincident with the pivot pin 51 of the guide assembly 45 such that the cable always enters at the correct angle onto the sheave 65B. Alternatively, the sheave may be pivotally mounted on the guide assembly 45. It will be noted in FIG. 4 the sheaves 65A and 65B are each mounted on respective ones of a pair of brackets 68 which, in turn, are attached to respective sleeves 69A and 69B. The sleeves 69A and 69B are journaled in the arm member 49 by bearings 70. The sleeves with the sheaves attached thereto, accordingly, may freely pivot allowing the sheaves to move by forces applied thereto from the cable passing over the sheaves. This pivotal movement is facilitated by locating pivot pins 66A and 66B in offset relation with respect to the pivot axis of the sleeves. The sleeves, if desired, may be continuous through the entire member 49, i.e., one member, or alternatively, consist of two separate parts 69A and 69B as illustrated in FIG. 4. In order to facilitate rotating sleeves 69A and 69B relative to one another, an end thrust bearing 71 is interposed therebetween allowing for independent rotational movement of the respective sleeve portions. The sleeves 69A and 69B are retained in the member 49 by respective ones of a pair of annular flanges 72 fitting into an enlargement in the sleeve member 49 and held captive by end plate members 73.

The guide assembly 45 is pivoted about pin 51 by a hydraulic cylinder assembly 80 connected to the mounting member 48 of guide assembly 45 by a pivot pin 81 passing through the rod end 82 of the hydraulic cylinder assembly. The cylinder portion of the assembly is connected to the mounting member 48 of the anchor assembly 44 by journals 83.

The anchor assembly 44 includes a pin 90 projecting rearwardly from the horizontal portion 49 of the assembly and mounted thereon is a shackle 92 serving detachably to connect cable 41 to the anchor. The shackle 92 may be retained on pin 91, for example, by a shear pin 93 designed to sever upon selected stress being placed on the anchor 44 by the cable 41. Cable 41, alternatively, may terminate in an end assembly having an enlarged head adapted to fit into a slot portion of a sleeve slidably mounted on the cable 41. An assembly of this latter type is commonly used on chokers for skidding trees.

With reference to FIG. 3, it will be noted the arms 47 of respective assemblies 44 and 45 are illustrated in phantom in various positions. Also, the sheaves 65A and 65B are illustrated in various positions whereby the cable is noted always to be in alignment with the sheave irrespective of the pivotal position of arm 47 about its pivotal mounting pin 51. One or both of the arms 47 may be pivoted from the closed position illustrated in FIG. 3 to an open or tree-receiving position. The choker assembly, accordingly, is constructed such that it may be remotely controlled so as to be moved to an open position for receiving trees and thereafter, to a closed position to embrace the collected group of trees. Winding the cable onto the winch drum after the arms are closed, tightly embraces and clamps the collected trees for skidding the same by the vehicle to a selected site. The position of a load relative to the vehicle in a stationary and moving state is diagrammatically illustrated in FIG. 4 where cable 41 is angularly disposed with respect to its loading position. The cable, during a trailing position, extends rearwardly from the sheave on guide assembly 45 and it will be readily apparent the arrangement is such that the cable will tend to stay on the sheave. This is contrary to prior art structures where the sheaves are mounted on pivot axes parallel to the direction of travel in which case any loads applied during skidding tend to cause the cable to be removed from the sheave.

Unloading may be effected by pivoting arms 47 to an open position and also unwinding the cable from drum 42 allowing the same to fall into a relatively deep catenary. With the load of trees on the ground, the vehicle may then be driven forwardly pulling the cable from beneath the load of trees. In the event the cable 41 catches on branches of the trees, the end of the cable secured to anchor 44 may be detached and either the vehicle driven forwardly to pull the single length of cable from the group of trees, or alternatively, the cable may be wound onto the winch drum to effect the same result.

Figure 6:
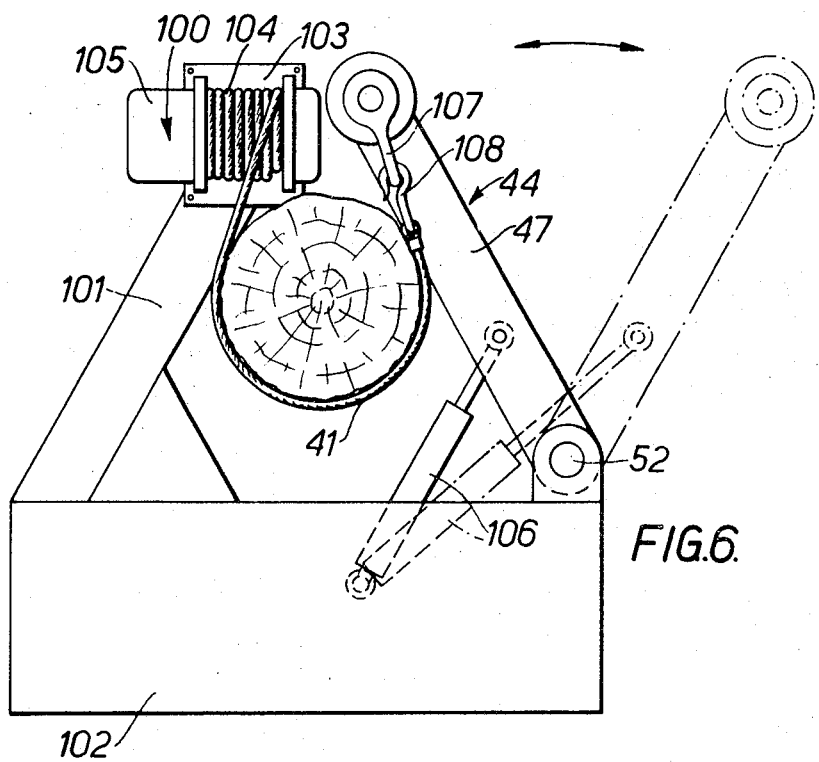
FIG. 6 is a rear partial elevational view similar to FIG. 3 illustrating an alternative position for the winch associated with the buncher assembly.
Figure 7:
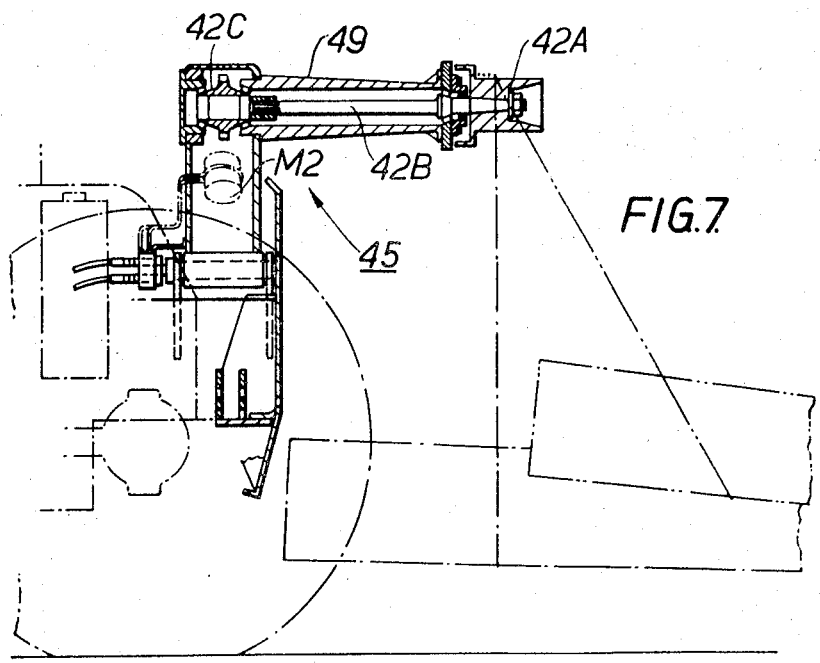
FIG. 7 is a partial side sectional elevational view similar to FIG. 4 illustrating a still further alternative arrangement for the winch.

An alternative arrangement of the winch and guide assembly is illustrated in FIG. 7 wherein a winch drum 42A is located at the rearward end of the horizontal portion of the arm 49 on the guide assembly 45. The winch drum 42A may be in any suitable manner, for example, by a drive shaft 42B connected to a hydraulic motor assembly M2 through a gear 42C connected to the shaft and meshing with a gear or gears driven by the motor. In the embodiment illustrated in FIG. 7, winch drum 42A pivots about an axis parallel to the pivot axis of the arm mounting pin 51. A still further alternative arrangement is illustrated in FIG. 6 wherein a winch assembly 100 is secured to a fixed arm member 101 attached to the vehicle or a mounting plate member 102 which, in turn, may be detachably mounted or fixedly secured to the vehicle. The winch assembly 100 is located at the free end of an arm 103 projecting rearwardly from the fixed arm 101 with respect to the direction of travel of the vehicle. The winch assembly 100 includes a winch drum 104 pivotally mounted for rotation about an axis perpendicular to the direction of travel of the vehicle. The winch drum 104 is driven by a hydraulic motor or the like, 105, located adjacent the winch drum.

In the embodiment illustrated in FIG. 6, the anchor 44 includes an arm 47 pivotally mounted on a pivot pin 52 journaled in suitable lugs on the mounting member 102. MOvement of the arm is effected by a hydraulic cylinder 106 for selectively opening and closing a jaw formed by the fixed arm 101, the pivotally mounted arm 47, and a flexible cable 41 spanning the two arms and extending from the winch 104 to an anchor point 107 on the arm 47. The cable 41 terminates in a hook 108 which is readily detachable from a U-shaped or apertured anchor member 107.

In all of the foregoing embodiments, the guide assembly and anchor are arranged such that the cable extending from one to the other is disposed rearwardly of the vehicle. The bunching apparatus, accordingly, is adapted to be mounted on any type of vehicle for converting the same to a skidder.

We claim:
1. A log-handling unit for a mobile vehicle to convert the same to a tree skidder comprising in combination:
   a. a base;
   b. an arm pivotally mounted on said base for movement about a first axis and having a free terminal end;
   c. a cable guide on said arm, adjacent said free terminal end, for directing and guiding a cable portion in a direction substantially parallel to said first axis; and
   d. a cable anchor secured to said base and located at a position spaced from the terminal end of said arm in a direction normal to said first axis.
2. A log-handling unit as defined in claim 1, including a winch assembly mounted on said base.
3. A log-handling unit as defined in claim 2 including a flexible cable wound on the drum of said winch assembly and extending therefrom to the guide and detachably connected to said cable anchor.
4. A log-handling unit as defined in claim 3 wherein said pivotally mounted arm and cable anchor are each substantially L-shaped arm members.
5. A log-handling unit as defined in claim 4, wherein said guide includes at least one sheave for rolling engagement with a cable passing thereover.
6. A log-handling unit as defined in claim 5 wherein each said sheave is pivotally mounted on said guide for movement about an axis substantially parallel to said first axis for maintaining the sheave in alignment with the cable irrespective of the pivotal position of the arm on said base.
7. A tree-bunching mechanism comprising, in combination:
   a. a base;
   b. a first arm on said base and having a cable anchor secured thereto;
   c. a second arm pivotally mounted on said base at a position spaced from said first arm and having the free end thereof movable toward said anchor to a first position adjacent thereto and away therefrom to a second position in selected spaced relation with respect thereto;
   d. a winch assembly on said base and including a drum;
   e. a flexible cable detachably connected to said anchor and connected to said drum for winding onto and off the same selectively to vary the size of a closed loop formed by said cable when said second arm is in said first position;
   f. means guiding said flexible member over said second arm at a position spaced from the pivotal mounting of such arm on said base and in a direction substantially parallel to the pivot axis of said arm;
   g. means to pivot said second arm on said base from said first position to said second position and vice versa, respectively to open and close said loop.
8. A device as defined in claim 7 wherein each of said pivotally mounted arm and anchor are substantially L-shaped members having a portion attached to said base and a further portion projecting outwardly therefrom whereby when said assembly is mounted on a mobile vehicle, the anchor and terminal end of the pivotally mounted arm are located rearwardly of such vehicle.
9. A device as defined in claim 7 wherein said guide means includes sheaves journaled on said arm and further pivotally mounted whereby the sheaves are permitted to remain in alignment with the cable irrespective of the pivotal position of the arm.
10. A mechanism as defined in claim 7 wherein said anchor is pivotally mounted on said base.
11. A mechanism as defined in claim 7 wherein said anchor is pivotally mounted on said base.
12. A mechanism as defined in claim 7 wherein said winch assembly is mounted on said base.
13. A mechanism as defined in claim 7 wherein at least the drum portion of said winch assembly is mounted on the free end of said pivotally mounted arm.
14. A log-pulling device comprising a mobile vehicle, a pair of arms pivotally mounted on said vehicle adjacent the trailing end thereof and each having rearwardly directed arm extensions, said rearwardly directed arm extensions together with the mounting therefor defining a rearwardly directed U-shape frame, a winch mounted on said vehicle, cable means anchored at one end to said winch for reeling in and paying out the same and at the other end extending between the arm extensions in a catenary fashion to receive a log or logs to be grasped thereby, said arm extensions being movable in a direction toward one another to position the ends of the catenary adjacent one another forming a substantially closed loop selectively varied in size by winding in and paying out the cable by the winch and movable away from one another for receiving trees to load the cable.
15. A log-skidding device as defined claim 14, including a cable guide on one of said arm extensions adjacent the free terminal end thereof for directing the cable thereat in a direction parallel to the length of the vehicle.
16. A log-pulling vehicle as defined in claim 15 wherein said cable guide is pivotally mounted on the arm extension associated therewith.

* * * * *

UNITED STATES PATENT OFFICE
CERTIFICATE OF CORRECTION

Patent No. 3,630,243          Dated December 28, 1971

Inventor(s) Douglas D. Hamilton, Domenico Benedetto

It is certified that error appears in the above-identified patent and that said Letters Patent are hereby corrected as shown below:

Column 1, line 8, change " Paper Company " to -- Canadian International Paper Company --

Signed and sealed this 26th day of September 1972.

(SEAL)
Attest:

EDWARD M. FLETCHER, JR.
Attesting Officer

ROBERT GOTTSCHALK
Commissioner of Patents